United States Patent
Obata et al.

(10) Patent No.: US 9,744,874 B2
(45) Date of Patent: Aug. 29, 2017

(54) ELECTRIC VEHICLE AND CONTROL METHOD FOR ELECTRIC VEHICLE

(71) Applicant: TOYOTA JIDOSHA KABUSHIKI KAISHA, Toyota-shi, Aichi-ken (JP)

(72) Inventors: Hiroyuki Obata, Nagoya (JP); Teruo Ishishita, Miyoshi (JP); Koichiro Muta, Okazaki (JP); Hideki Kamatani, Nagoya (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 45 days.

(21) Appl. No.: 15/078,737

(22) Filed: Mar. 23, 2016

(65) Prior Publication Data
US 2016/0280093 A1 Sep. 29, 2016

(30) Foreign Application Priority Data
Mar. 25, 2015 (JP) .................. 2015-062470

(51) Int. Cl.
*B60L 11/18* (2006.01)
*B60L 3/00* (2006.01)
(Continued)

(52) U.S. Cl.
CPC ......... *B60L 11/1862* (2013.01); *B60L 3/0046* (2013.01); *B60L 11/123* (2013.01);
(Continued)

(58) Field of Classification Search
CPC .... B60L 11/1862; B60L 11/123; B60L 11/14; B60L 11/1857; B60L 11/1859;
(Continued)

(56) References Cited

U.S. PATENT DOCUMENTS

| 9,614,258 | B2* | 4/2017 | Takahashi | ............. | H01M 10/48 |
| 2002/0157882 | A1 | 10/2002 | Kubo et al. | | |

(Continued)

FOREIGN PATENT DOCUMENTS

| EP | 2502776 A1 | 9/2012 |
| JP | 2000-030753 A | 1/2000 |

(Continued)

*Primary Examiner* — Mary Cheung
(74) *Attorney, Agent, or Firm* — Oliff PLC

(57) ABSTRACT

An electric vehicle includes: a vehicle drive apparatus configured to receive electricity to generate vehicle drive power and to generate electricity; a secondary battery that selectively receives and outputs electricity from/to the vehicle drive apparatus; a current sensor that selectively detects (a) an electric current to be input into the secondary battery and (b) an electric current output from the secondary battery; and an electronic control unit configured to control charging and discharging of the secondary battery, and configured to calculate, using a detected value from the current sensor, an evaluation value indicating a degree of deterioration of the secondary battery due to non-uniformity in salt concentration in the secondary battery caused by charging and discharging of the secondary battery. The electronic control unit is configured to execute a capacity-raising control in which a remaining capacity of the secondary battery is raised when the evaluation value reaches a prescribed threshold.

10 Claims, 6 Drawing Sheets

(51) Int. Cl.
  *B60L 11/12* (2006.01)
  *B60L 11/14* (2006.01)

(52) U.S. Cl.
  CPC ............ *B60L 11/14* (2013.01); *B60L 11/1857* (2013.01); *B60L 11/1859* (2013.01); *B60L 2240/44* (2013.01); *B60L 2240/545* (2013.01); *B60L 2240/547* (2013.01); *B60L 2240/549* (2013.01); *Y02T 10/7005* (2013.01); *Y02T 10/705* (2013.01); *Y02T 10/7044* (2013.01)

(58) Field of Classification Search
  CPC ............... B60L 3/0046; B60L 2240/44; B60L 2240/547; B60L 2240/549; B60L 2240/545; Y02T 10/7044; Y02T 10/7005; Y02T 10/705
  See application file for complete search history.

(56) References Cited

U.S. PATENT DOCUMENTS

| | | | |
|---|---|---|---|
| 2004/0234865 A1* | 11/2004 | Sato | H01M 4/13 429/322 |
| 2006/0008705 A1* | 1/2006 | Iijima | H01M 4/13 429/231.95 |
| 2006/0061330 A1* | 3/2006 | Sato | H01M 10/44 320/125 |
| 2008/0231237 A1* | 9/2008 | Kishi | H02J 7/0073 320/160 |
| 2010/0204861 A1* | 8/2010 | Kaita | B60L 11/1851 701/22 |
| 2010/0241376 A1 | 9/2010 | Kikuchi et al. | |
| 2013/0293200 A1 | 11/2013 | Obata et al. | |
| 2014/0225571 A1 | 8/2014 | Obata et al. | |
| 2016/0023570 A1* | 1/2016 | Takeda | G05G 1/30 701/22 |
| 2017/0047622 A1* | 2/2017 | Tashiro | G01R 31/362 |

FOREIGN PATENT DOCUMENTS

| | | |
|---|---|---|
| JP | 2004-186087 A | 7/2004 |
| JP | 2009-123435 A | 6/2009 |
| JP | 2010-060406 A | 3/2010 |
| JP | 2013-227017 A | 11/2013 |
| JP | 2014-217179 A | 11/2014 |
| WO | 2012/101678 A1 | 8/2012 |
| WO | 2013/046263 A1 | 4/2013 |

* cited by examiner

ELECTRIC VEHICLE AND CONTROL METHOD FOR ELECTRIC VEHICLE

INCORPORATION BY REFERENCE

The disclosure of Japanese Patent Application No. 2015-062470 filed on Mar. 25, 2015 including the specification, drawings and abstract is incorporated herein by reference in its entirety.

BACKGROUND

1. Technical Field

The disclosure relates generally to an electric vehicle and a control method for an electric vehicle, and relates more specifically to a control technique of inhibiting deterioration of a secondary battery mounted in an electric vehicle.

2. Description of Related Art

As a secondary battery is charged with electricity or electricity is discharged from the secondary battery, the salt concentration in an electrolytic solution of the secondary battery becomes non-uniform, resulting in an increase in the internal resistance of the secondary battery. Such an increase in the internal resistance due to a non-uniform salt concentration may be caused especially by high-current charging or high-current discharging. Deterioration of the secondary battery thus caused is referred to as, for example, "high-rate deterioration", in distinction from aged deterioration.

According to Japanese Patent Application Publication No. 2010-60406 (JP 2010-60406 A), when an evaluation value that may indicate the degree of high-rate deterioration exceeds a prescribed value, the control central value of state of charge (SOC) that indicates the remaining capacity of the secondary battery is adjusted (changed). Specifically, a monitoring device described in JP 2010-60406 A lowers the control central value of the SOC to a value below a normally set value, thereby allowing the secondary battery to be charged with a larger amount of electricity. As a result, the battery resistance is promptly recovered to a normal state.

However, when the control central value of the SOC is lowered to a value below the normally set value, the secondary battery is used in a low-SOC range (range in which the SOC is low). In the low-SOC range, expansion and contraction of the negative electrode of the battery become large and thus an electrolytic solution in a battery cell is more easily pushed out. Thus, the salt concentration in a battery cell surface more easily becomes non-uniform. As a result, "high-rate deterioration" described above may be promoted.

SUMMARY

The embodiments provide an electric vehicle having a secondary battery and configured such that high-rate deterioration of the secondary battery is reliably inhibited, and also provides a control method for the electric vehicle.

One aspect relates to an electric vehicle including a vehicle drive apparatus, a secondary battery, a current sensor, and an electronic control unit. The vehicle drive apparatus is configured to receive electricity to generate vehicle drive power and is configured to generate electricity. The secondary battery selectively (i) receives electricity from the vehicle drive apparatus and (ii) outputs electricity to the vehicle drive apparatus. The current sensor selectively detects (a) an electric current to be input into the secondary battery and (b) an electric current output from the secondary battery. The electronic control unit is configured to control charging and discharging of the secondary battery, and is configured to calculate, using a detected value of the electric current from the current sensor, an evaluation value ($\Sigma D$) indicating a degree of deterioration of the secondary battery due to non-uniformity in salt concentration in the secondary battery caused by charging and discharging of the secondary battery. The evaluation value is an integrated value of damage quantities of the secondary battery and is calculated based on the detected value of the electric current and an energizing time of the electric current. The electronic control unit is configured to execute a capacity-raising control in which a remaining capacity (SOC) of the secondary battery is raised, the capacity-raising control being executed by the electronic control unit when the evaluation value reaches a prescribed threshold.

The electronic control unit may be configured to control charging and discharging of the secondary battery such that the remaining capacity approaches a prescribed target. Further, the electronic control unit may be configured to execute the capacity-raising control to raise, when the evaluation value reaches the prescribed threshold, a value of the prescribed target to a value higher than the value used when the evaluation value is lower than the prescribed threshold.

The electronic control unit may be configured to control charging and discharging of the secondary battery such that the remaining capacity remains within a prescribed range. Further, the electronic control unit may be configured to execute the capacity-raising control to raise, when the evaluation value reaches the prescribed threshold, the prescribed range to a range higher than the prescribed range used when the evaluation value is lower than the prescribed threshold.

With the above-described configuration, when the evaluation value ($\Sigma D$) reaches the prescribed threshold and thus high-rate deterioration may occur, it is possible to avoid the situation where the secondary battery is charged in a low SOC range in which high-rate deterioration may be promoted. Therefore, in the electric vehicle, it is possible to reliably inhibit the high-rate deterioration of the secondary battery.

Another aspect relates to a control method for an electric vehicle. The electric vehicle includes a vehicle drive apparatus, a secondary battery, a current sensor, and an electronic control unit. The vehicle drive apparatus is configured to receive electricity to generate vehicle drive power and is configured to generate electricity. The secondary battery selectively (i) receives electricity from the vehicle drive apparatus and (ii) outputs electricity to the vehicle drive apparatus. The current sensor selectively detects (a) an electric current to be input into the secondary battery and (b) an electric current output from the secondary battery. The control method is performed by the electronic control unit and includes calculating, using a detected value of the electric current from the current sensor, an evaluation value ($\Sigma D$) indicating a degree of deterioration of the secondary battery due to non-uniformity in salt concentration in the secondary battery caused by charging and discharging of the secondary battery; and executing a capacity-raising control in which a remaining capacity of the secondary battery is raised, the capacity-raising control being executed when the evaluation value reaches a prescribed threshold. The evaluation value is an integrated value of damage quantities of the secondary battery that is calculated based on the detected value of the electric current and an energizing time of the electric current.

Charging and discharging of the secondary battery may be controlled such that the remaining capacity approaches a prescribed target. When the evaluation value reaches the prescribed threshold, the capacity-raising control is executed to raise a value of the prescribed target to a value higher than the value used when the evaluation value is lower than the prescribed threshold.

Charging and discharging of the secondary battery may be controlled such that the remaining capacity remains within a prescribed range. When the evaluation value reaches the prescribed threshold, the capacity-raising control is executed to raise the prescribed range to a range higher than the prescribed range used when the evaluation value is lower than the prescribed threshold.

With the above-described control method, when the evaluation value (ΣD) reaches the prescribed threshold and thus high-rate deterioration may occur, it is possible to avoid the situation where the secondary battery is charged in a low SOC range in which high-rate deterioration may be promoted. Therefore, with this control method, it is possible to reliably inhibit the high-rate deterioration of the secondary battery.

According to the embodiments, in an electric vehicle including a secondary battery, it is possible to reliably inhibit high-rate deterioration of the secondary battery.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Figure 1:
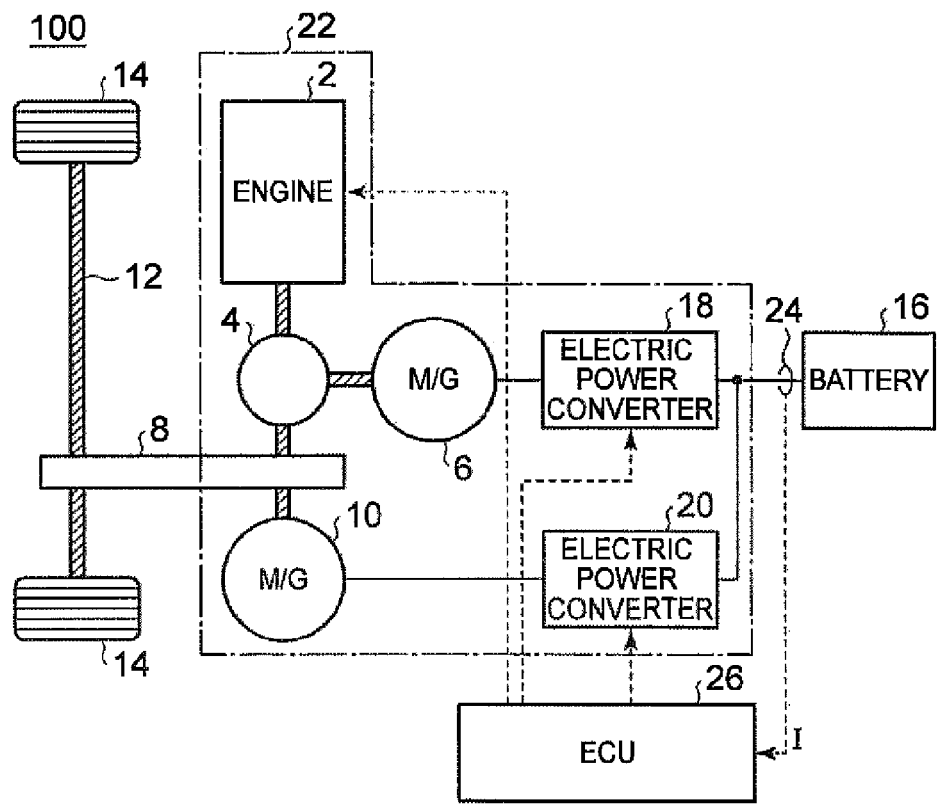
FIG. 1 is a block diagram illustrating the overall configuration of a hybrid vehicle, which is an example of an electric vehicle according to a first embodiment.

Hereinafter, example embodiments will be described in detail with reference to the accompanying drawings. While a plurality of example embodiments will be described below, the configurations described in the example embodiments may be combined together as appropriate. Note that the same or equivalent elements in the drawings will be denoted by the same reference symbols, and the description thereof will not be repeated.

First Embodiment

FIG. 1 is a block diagram illustrating the overall configuration of a hybrid vehicle 100, which is an example of an electric vehicle according to a first embodiment. As illustrated in FIG. 1, a hybrid vehicle 100 includes a vehicle drive apparatus 22, a transmission gear 8, a drive shaft 12, wheels 14, a battery 16, and an electronic control unit (ECU) 26.

The vehicle drive apparatus 22 is configured to generate vehicle drive power and also is able to generate electricity. Specifically, the vehicle drive apparatus 22 includes an engine 2, a power split device 4, motor generators 6, 10, and electric power converters 18, 20.

The engine 2 is an internal combustion engine that outputs power by converting thermal energy produced by fuel combustion into kinetic energy of a motion device, such as a piston or a rotor. As the fuel for the engine 2, a hydrocarbon fuel, such as gasoline, light oil, ethanol, or natural gas; or a liquid or gas hydrogen fuel may be preferably employed.

Each of the motor generators 6, 10 is an alternating-current (AC) rotary electric machine, for example, a three-phase alternating current (AC) synchronous electric motor in which permanent magnets are embedded in a rotor. The motor generator 6 is used as an electric generator that is driven by the engine 2 via the power split device 4, and used also as an electric motor for starting the engine 2. The motor generator 10 operates mainly as an electric motor, and drives the drive shaft 12. When brakes are applied to the hybrid vehicle 100 or when acceleration is reduced on a downhill slope, the motor generator 10 operates as an electric generator to perform regenerative power generation.

The power split device 4 includes a planetary gear mechanism including three rotary elements that are, for example, a sun gear, a carrier, and a ring gear. The power split device 4 splits the drive power generated by the engine 2 into power to be transmitted to a rotary shaft of the motor generator 6 and power to be transmitted to the transmission gear 8. The transmission gear 8 is coupled to the drive shaft 12 for driving the wheels 14. The transmission gear 8 is also coupled to a rotary shaft of the motor generator 10.

The battery 16 is a rechargeable secondary battery, for example, a secondary battery, such as a nickel-metal-hydride battery or a lithium-ion battery. The battery 16 supplies electricity to the electric power converters 18, 20. During electricity generation by the motor generator 6 and/or the motor generator 10, the battery 16 is charged with the generated electricity. A current sensor 24 detects an electric current I that is input into the battery 16 or output from the battery 16 (detects the electric current I output from the battery 16 (discharging current) as a positive value, and detects the electric current I input into the battery 16 (charging current) as a negative value), and outputs the detected value to the ECU 26.

The remaining capacity of the battery 16 is indicated by, for example, a state of charge (SOC), which is a percentage of the amount of electricity presently stored in the battery 16 with respect to the fully charged state of the battery 16. The SOC is calculated based on, for example, a detected value obtained by the current sensor 24 and/or a detected value obtained by a voltage sensor (not illustrated). The SOC may be calculated by the ECU 26 or by another electronic control unit (ECU) provided for the battery 16.

The electric power converter 18 performs bidirectional DC-AC power conversion between the motor generator 6 and the battery 16, based on a control signal received from the ECU 26. Similarly, the electric power converter 20 performs bidirectional DC-AC power conversion between the motor generator 10 and the battery 16, based on a control signal received from the ECU 26. Thus, when receiving electricity from the battery 16 or supplying electricity to the battery 16, each of the motor generators 6, 10 outputs a positive torque for operation as an electric motor or outputs a negative torque for operation as an electric generator. The electric power converters 18, 20 are, for example, inverters. A boost converter for DC voltage conversion may be disposed between the battery 16 and the electric power converters 18, 20.

The ECU 26 includes, for example, a central processing unit (CPU), memory devices, and an input-output buffer (none of which are illustrated), and executes various controls of devices in the hybrid vehicle 100. Note that these controls may be executed by not only software processing but also processing by dedicated hardware (electronic circuit).

In the main control executed by the ECU 26, the ECU 26 calculates a vehicle drive torque (requested value) based on a vehicle speed and an accelerator position corresponding to the operation degree of an accelerator pedal, and calculates vehicle drive power (requested value) based on the calculated vehicle drive torque. In addition, the ECU 26 further calculates requested charging power for the battery 16 based on the SOC of the battery 16, and controls the vehicle drive apparatus 22 such that the vehicle drive apparatus 22 generates power (hereafter, referred to as "vehicle power") that corresponds to the sum of the vehicle drive power and the requested charging power.

When the vehicle power is low, the ECU 26 controls the vehicle drive apparatus 22 such that the engine 2 is stopped and the hybrid vehicle 100 travels using only the motor generator 10 as a drive source (EV (electric vehicle) travelling). This causes the battery 16 to discharge electricity, so that the SOC of the battery 16 is reduced. When the vehicle power is increased, the ECU 26 controls the vehicle drive apparatus 22 such that the engine 2 is operated to cause the hybrid vehicle 100 to travel (HV (hybrid vehicle) travelling). In this case, when the output from the engine 2 is higher than the vehicle power, the battery 16 is charged with electricity, whereas when the vehicle power is higher than the output from the engine 2, electricity is discharged from the battery 16.

Figure 2:
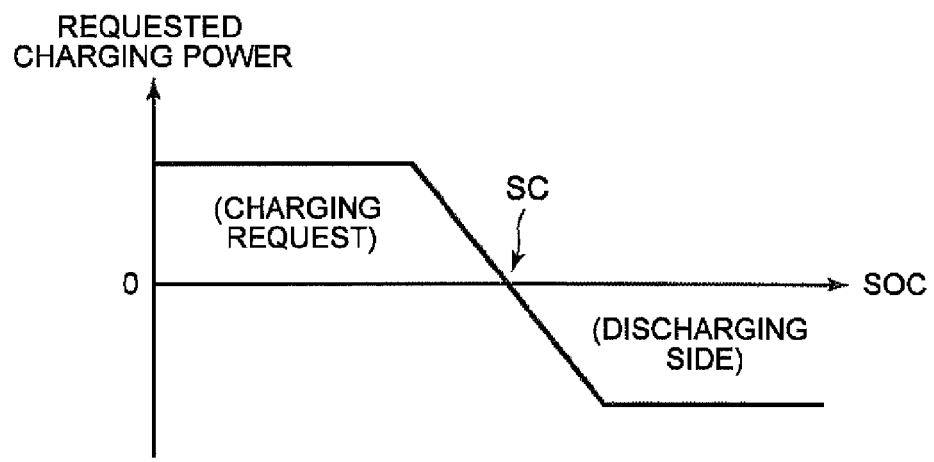
FIG. 2 is a graph illustrating the relationship between the state of charge (SOC) and the requested charging power.

In addition, the ECU 26 controls the SOC of the battery 16. Specifically, the requested charging power for the battery 16 is calculated based on the SOC of the battery 16 as described above. The ECU 26 determines the requested charging power for the battery 16 based on the deviation between the SOC (calculation value) and a target SC of the SOC as illustrated in FIG. 2, thereby adjusting the SOC of the battery 16 to the target SC.

Referring again to FIG. 1, when the SOC of the battery 16 is lowered, the ECU 26 executes control for forcibly charging the battery 16 with electricity. That is, even in the case where the requested charging power for the battery 16 is determined based on the deviation between the SOC (calculation value) and the target SC as described above, when the vehicle drive power is low and thus the vehicle power is low, the engine 2 does not operate and thus the SOC may be lowered. Thus, when the SOC is lowered to a prescribed lower limit, the ECU 26 starts the engine 2 to cause the battery 16 to be forcibly charged with electricity so that the SOC increases to a prescribed upper limit that is higher than the lower limit. The engine is thus controlled to run even though the requested vehicle drive power is low.

In addition, the ECU 26 evaluates the degree of deterioration of the battery 16 due to continuous non-uniformity in the salt concentration in the battery 16 due to charging or discharging of the battery 16. A method of calculating an evaluation value $\Sigma D$ that indicates the degree of deterioration of the battery 16 will be described later in detail. The evaluation value $\Sigma D$ takes a negative value when the salt concentration becomes non-uniform because the battery 16 is used so as to be charged excessively, whereas takes a positive value when the salt concentration becomes non-uniform because the battery 16 is used so as to be discharged excessively. Then, when the evaluation value $\Sigma D$ reaches a prescribed lower limit level (negative value), the ECU 26 limits an allowable charging power Win that indicates the upper limit of charging power of the battery 16, whereas when the evaluation value reaches a prescribed upper limit level (positive value), the ECU 26 limits an allowable discharging power Wout that indicates the upper limit of discharging power of the battery 16.

Furthermore, when the evaluation value $\Sigma D$ indicating the degree of deterioration of the battery 16 reaches a prescribed threshold (negative value) that is slightly higher than the lower limit level, the ECU 26 executes control for increasing the SOC of the battery 16. Specifically, in the hybrid vehicle 100 according to the first embodiment, when the evaluation value $\Sigma D$ reaches the threshold (negative value), the ECU 26 makes the target SC of the SOC higher than that used before the evaluation value $\Sigma D$ reaches the threshold (FIG. 2). It is thus possible to reliably inhibit the high-rate deterioration of the battery 16. This will be described below.

The high-rate deterioration has been considered to occur in particular in the case where charging is performed at a high rate and discharging is performed at a low rate, or in the case where discharging is performed at a high rate and charging is performed at a low rate. However, the present inventors have realized that, even if neither charging at a high rate nor discharging at a high rate is performed, when the hybrid vehicle 100 keeps travelling for a long time, the salt concentration in the battery 16 gradually becomes non-uniform and the evaluation value increases in the negative direction (hereafter, deterioration of the battery 16 that is caused due to non-uniformity in the salt concentration in the battery 16 even if neither charging at a high rate nor discharging at a high rate is performed, will be referred to as "high-rate deterioration", in distinction from aged deterioration).

In a low-SOC range (range in which the SOC is low), expansion and contraction of the negative electrode of the battery 16 become large and thus an electrolytic solution in a battery cell is more easily pushed out. Thus, the salt concentration in a battery cell surface more easily becomes non-uniform. As a result, high-rate deterioration may be promoted. Thus, in the hybrid vehicle 100 according to the first embodiment, when the evaluation value $\Sigma D$ reaches the prescribed threshold (negative value) that is set to a value slightly higher than the lower limit level at which the allowable charging power Win is limited, the target SC of the SOC is raised. This generally keeps the SOC of the battery at a higher level, which makes it possible to avoid the situation where the battery 16 is charged in the low SOC range in which high-rate deterioration may be promoted, thereby preventing promotion of the high-rate deterioration.

Figure 3:
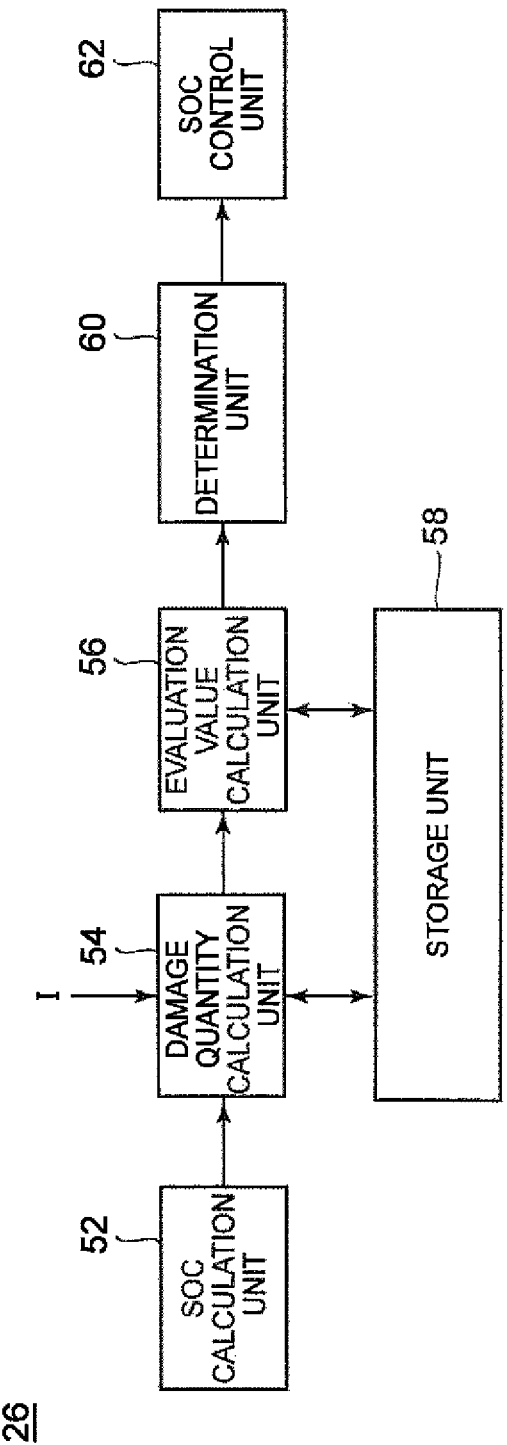
FIG. 3 is a functional block diagram of an ECU illustrated in FIG. 1.

FIG. 3 a functional block diagram of the ECU 26 illustrated in FIG. 1. Note that FIG. 3 illustrates only the controls relating to high-rate deterioration, from among various controls that are executed by the ECU 26. As illustrated in FIG. 3, the ECU 26 includes a SOC calculation unit 52, a damage quantity (D) calculation unit 54, an evaluation value ($\Sigma D$) calculation unit 56, a storage unit 58, a determination unit 60, and a SOC control unit 62.

The SOC calculation unit 52 calculates the SOC of the battery 16 based on the electric current of the battery 16 that is detected by the current sensor 24 (FIG. 1) and/or the voltage of the battery 16 that is detected by a voltage sensor (not illustrated). Various well-known methods may be used as a concrete method of calculating the SOC.

The damage quantity (D) calculation unit 54 calculates a damage quantity D of the battery 16 due to non-uniformity in the salt concentration in the battery 16, based on the SOC calculated by the SOC calculation unit 52 and the electric current I detected by the current sensor 24. The damage quantity D is calculated in a prescribed cycle Δt by, for example, Expression (1) indicated below.

$$D(N)=D(N-1)-\alpha \times \Delta t \times D(N-1)+(\beta/C)\times I \times \Delta t \quad \text{Expression (1)}$$

In Expression (1), D(N) denotes a present calculation value of the damage quantity D, and D(N−1) denotes an immediately preceding calculation value of the damage quantity D that is calculated the cycle Δt before the present calculation. D(N−1) is stored in the storage unit 58 at the time of immediately preceding calculation, and read from the storage unit 58 at the time of present calculation.

The second term on the right side in Expression (1), that is, α×Δt×D(N−1), is a reduction term of the damage quantity D, and indicates a component when the degree of non-uniformity in the salt concentration is reduced. α is a forgetting coefficient, and is a coefficient corresponding to the diffusion velocity of ions in the electrolytic solution of the battery 16. The forgetting coefficient α becomes larger as the diffusion velocity becomes higher. The value of α×Δt is set so as to be within a range from 0 to 1. The reduction term of the damage quantity D takes a larger value as the forgetting coefficient α is larger (i.e., as the diffusion velocity of ions is higher), or as the cycle Δt is longer.

The forgetting coefficient α depends on the SOC of the battery 16 or the temperature of the battery 16. The correlation between the forgetting coefficient α, and the SOC and temperature of the battery 16 is obtained in advance by, for example, experiments, and stored in the storage unit 58. Then, the forgetting coefficient α is set based on the SOC and temperature of the battery 16 at the time of calculation. For example, when the temperature of the battery 16 is constant, the forgetting coefficient α is set to a larger value as the SOC of the battery 16 is higher, whereas when the SOC of the battery 16 is constant, the forgetting coefficient α is set to a larger value as the temperature of the battery 16 is higher.

The third term on the right side in Expression (1), that is, (β/C)×I×Δt, is an increase term of the damage quantity D, and indicates a component when the non-uniformity in the salt concentration occurs. β is a current coefficient, and C denotes a limit threshold. The increase term of the damage quantity D takes a larger value as the electric current I is higher, or as the cycle Δt is longer.

The current coefficient β and the limit threshold C depend on the SOC of the battery 16 and the temperature of the battery 16. The correlation between each of the current coefficient β and the limit threshold C, and the SOC and temperature of the battery 16 is obtained in advance by, for example, experiments, and stored in the storage unit 58. Then, the current coefficient β and the limit threshold C are set based on the SOC and temperature of the battery 16 at the time of calculation. For example, when the temperature of the battery 16 is constant, the limit threshold C is set to a larger value as the SOC of the battery 16 is higher, whereas when the SOC of the battery 16 is constant, the limit threshold C is set to a larger value as the temperature of the battery 16 is higher.

As described above, the occurrence of non-uniformity in the salt concentration and reduction in the degree of non-uniformity in the salt concentration are expressed respectively by the above-described increase term and reduction term, and the present damage quantity D is calculated using the increase term and the reduction term. This makes it possible to appropriately acquire variations (increase and decrease) in the degree of non-uniformity in the salt concentration, which is considered to be a factor of high-rate deterioration.

The evaluation value (ΣD) calculation unit 56 calculates an evaluation value ΣD that indicates the degree of high-rate deterioration of the battery 16. The progress state of high-rate deterioration is evaluated using an integrated value of the damage quantities D calculated by the damage quantity calculation unit 54. The evaluation value ΣD is calculated based on, for example, Expression (2) indicated below.

$$\Sigma D(N)=\gamma \times \Sigma D(N-1)+\eta \times D(N) \quad \text{Expression (2).}$$

In Expression (2), ΣD(N) denotes a present calculation value of the evaluation value, and ΣD(N−1) denotes an immediately preceding calculation value of the evaluation value that is calculated the cycle Δt before the present calculation. γ is an attenuation coefficient, and η is a correction coefficient. ΣD(N−1) is stored in the storage unit 58 at the time of immediately preceding calculation, and read from the storage unit 58 at the time of present calculation. The attenuation coefficient γ and the correction coefficient η are stored in advance in the storage unit 58, and read from the storage unit 58 at the time of present calculation.

The attenuation coefficient γ is set to a value less than one. The attenuation coefficient γ is set in this way in view of the fact that the immediately preceding evaluation value ΣD(N−1) is decreased at the time of calculation of the present evaluation value ΣD(N) because the degree of non-uniformity in the salt concentration is reduced by the diffusion of ions with the lapse of time. The correction coefficient η is set as appropriate.

When the battery 16 is used so as to be discharged excessively, the evaluation value ΣD calculated in the above-described manner increases in the positive direction (positive value) with an increase in the degree of non-uniformity in the salt concentration due to excessive discharging. On the other hand, when the battery 16 is used so as to be charged excessively, the evaluation value ΣD increases in the negative direction (the evaluation value ΣD increases as a negative value) with an increase in the degree of non-uniformity in the salt concentration due to excessive charging.

The determination unit 60 determines whether the evaluation value ΣD calculated by the evaluation value calculation unit 56 reaches the prescribed threshold. Specifically, as described above, the first embodiment is provided to inhibit high-rate deterioration in the case where the salt concentration in the battery 16 becomes gradually non-uniform due to the use of the hybrid vehicle 100 for a long period and the evaluation value ΣD increases in the negative direction. Thus, the determination unit 60 determines whether the evaluation value ΣD reaches the prescribed threshold (negative value). In addition, the determination unit 60 determines whether the evaluation value ΣD reaches the prescribed lower limit that is lower (larger, in terms of the absolute value of the evaluation value ΣD) than the threshold.

When the determination unit 60 determines that the evaluation value ΣD reaches the threshold, the SOC control unit 62 raises the target SC of the SOC (FIG. 2). As described above, in the range in which the SOC of the battery 16 is low, the salt concentration in a battery cell surface more easily becomes non-uniform, and, as a result, high-rate deterioration may be promoted (it can be understood also from Expression (1) that the damage quantity D decreases by a smaller amount and increases by a larger amount because the forgetting coefficient α and the limit threshold C are smaller as the SOC is lower). Thus, in the first embodiment, the SOC is raised by raising the target SC of the SOC when the evaluation value ΣD reaches the threshold, to avoid the situation where the battery 16 is charged in the low SOC range in which high-rate deterioration may be promoted.

Figure 4:
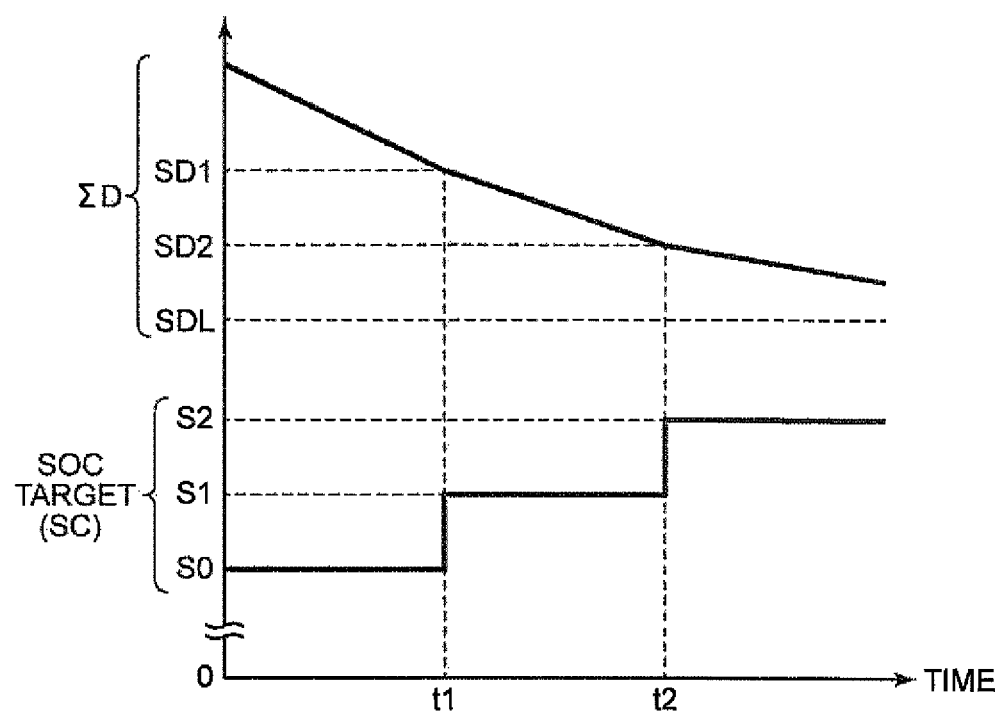
FIG. 4 is a graph illustrating the relationship between the evaluation value ΣD of high-rate deterioration and the SOC target (SC)

FIG. 4 is a graph illustrating the relationship between the evaluation value ΣD of high-rate deterioration and the target (SC) of SOC. As illustrated in FIG. 4, when the evaluation value ΣD increases as a negative value and reaches a threshold SD1 (negative value) at time t1, the target SC indicating the target of SOC (FIG. 2) is raised from S0, which is used at normal times, to S1. This reduces the rate of increase in the evaluation value ΣD in the negative direction.

When the evaluation value ΣD reaches a threshold SD2 (negative value, SD2<SD1) at time t2, the target SC is further raised to S2. This further reduces the rate of increase in the evaluation value ΣD in the negative direction.

When the evaluation value ΣD reaches the lower limit SDL, the SOC control unit 62 (FIG. 3) limits the allowable charging power Win of the battery 16. When the allowable charging power Win is limited, the amount of electricity charged by regeneration during the application of the brakes to the vehicle is limited, and thus the fuel efficiency of the hybrid vehicle 100 is reduced. Therefore, in the first embodiment, when the evaluation value ΣD reaches the threshold (SD1, SD2) before the evaluation value ΣD reaches the lower limit SDL, the target SC is raised to raise the SOC. As a result, the rate of increase in the evaluation value ΣD in the negative direction is reduced, and reduction of fuel efficiency is suppressed.

Figure 5:
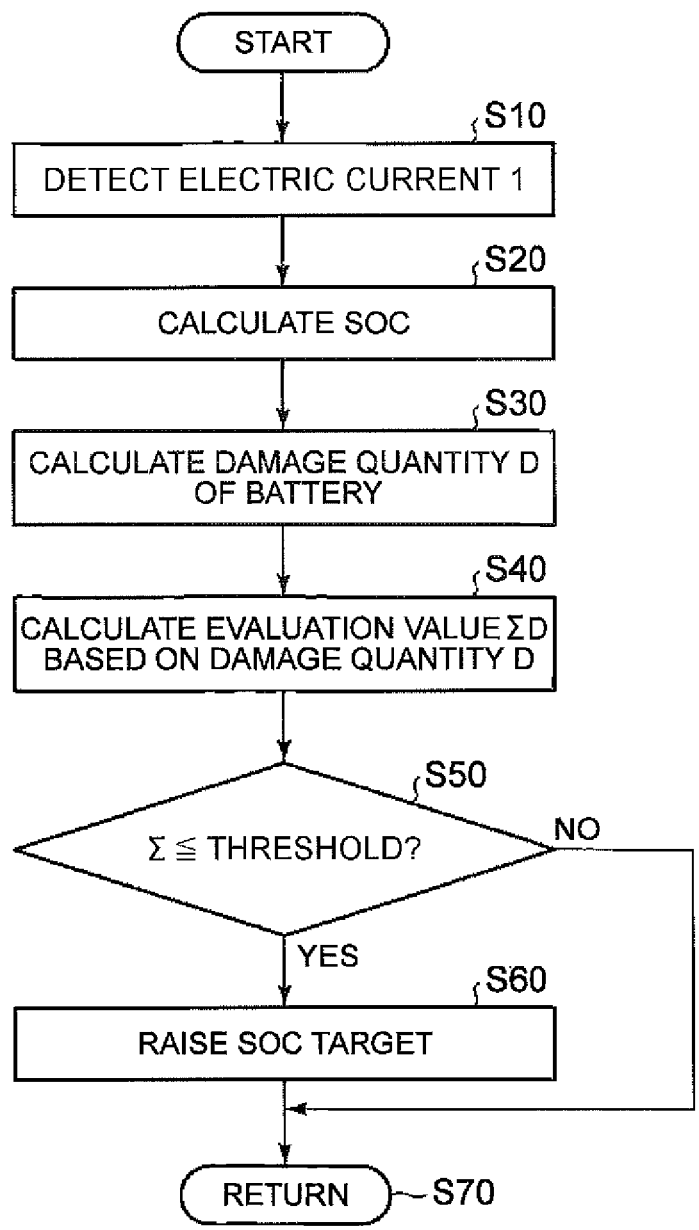
FIG. 5 is a flowchart illustrating the procedure of a high-rate deterioration inhibiting process executed by the ECU illustrated in FIG. 1.

FIG. 5 is a flowchart illustrating the procedure of a high-rate deterioration inhibiting process executed by the ECU 26 illustrated in FIG. 1. The process illustrated in the flowchart is invoked from a main routine and executed in the prescribed cycle Δt.

As illustrated in FIG. 5, the ECU 26 detects the electric current I that is input into the battery 16 or that is output from the battery 16, using the current sensor 24 (step S10). Next, the ECU 26 calculates the SOC of the battery 16 (step S20). Note that the SOC may be calculated by various known methods.

Subsequently, the ECU 26 calculates the damage quantity D of the battery 16 based on the electric current I detected in step S10 and the SOC calculated in step S20, by using Expression (1) described above (step S30). Then, the ECU 26 calculates the evaluation value ΣD indicating the degree of high-rate deterioration of the battery 16 based on the damage quantity D calculated in step S30, by using Expression (2) described above (step S40).

When the evaluation value ΣD is calculated, the ECU 26 determines whether the evaluation value ΣD reaches the prescribed threshold (negative value) (step S50). In the first embodiment, as illustrated in FIG. 4, two-staged thresholds, that is, the thresholds SD1, SD2 are used. However, the manner of setting the threshold is not limited to this. For example, only one threshold may be used.

When the ECU 26 determines in step S50 that the evaluation value ΣD reaches the threshold (YES in step S50), the ECU 26 raises the target SC indicating the target of the SOC (FIG. 2) (step S60). Specifically, as illustrated in FIG. 4, when the ECU 26 determines that the evaluation value ΣD reaches the threshold SD1, the ECU 26 raises the target SC from S0, which is used at normal times, to S1. When the ECU 26 determines that the evaluation value ΣD reaches the threshold SD2 (SD2<SD1), the ECU 26 further raises the target SC from S1 to S2.

When the ECU 26 determines in step S50 that the evaluation value ΣD does not reach the threshold (NO in step S50), the ECU 26 proceeds to step S70 without executing step S60.

As described above, in the first embodiment, the degree of deterioration of the battery 16 due to continuous non-uniformity in the salt concentration in the battery 16 caused by charging or discharging is evaluated with the use of the evaluation value ΣD. When the evaluation value ΣD reaches the prescribed threshold (negative value), the target SC indicating the target of the SOC is raised. It is thus possible to avoid the situation where the battery 16 is charged with electricity in the low SOC range in which high-rate deterioration may be promoted. Therefore, according to the first embodiment, it is possible to reliably inhibit high-rate deterioration of a secondary battery.

Second Embodiment

In the first embodiment, the target SC of the SOC is raised when the evaluation value ΣD indicating the degree of high-rate deterioration reaches the prescribed threshold (negative value). In a second embodiment, in order to raise the SOC when the evaluation value ΣD reaches the threshold, a SOC range in which control for forcibly charging the battery 16 (hereafter, referred also to as "forced charging") is executed (range from a control lower limit at which the forced charging is started to a control upper limit at which the forced charging ends) is raised.

Figure 6:
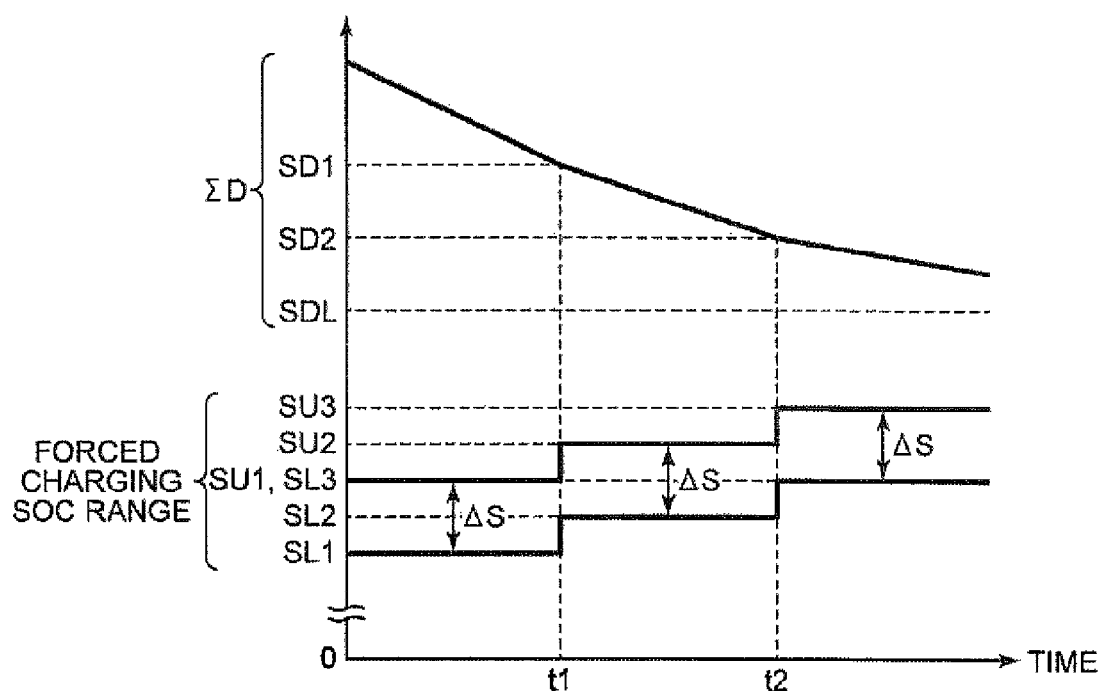
FIG. 6 is a graph illustrating the relationship between the evaluation value ΣD of high-rate deterioration and the SOC range in which forced charging is executed.

FIG. 6 a graph illustrating the relationship between the evaluation value ΣD of high-rate deterioration and the SOC range in which forced charging is executed. As illustrated in FIG. 6, when the evaluation value ΣD increases as a negative value to reach the threshold SD1 (negative value) at time t1, the SOC range in which the forced charging is executed is raised from a range used at normal times. Specifically, the SOC range in which the forced charging is executed is set such that, until the evaluation value ΣD reaches the threshold SD1, the engine 2 (FIG. 1) is started and the forced charging is started when the SOC falls to the lower limit SL1, and the forced charging ends when the SOC increases to an upper limit SU1. After the evaluation value ΣD reaches the threshold SD1, the SOC range in which the forced charging is executed is raised such that the engine 2 is started and the forced charging is started when the SOC falls to a lower limit SL2 (SL2>SL1), and the forced charging ends when the SOC increases to an upper limit SU2 (SU2>SU1). As a result, the rate of increase in the evaluation value ΣD in the negative direction is reduced.

When the evaluation value ΣD reaches the threshold SD2 (negative value, SD2<SD1) at time t2, the SOC range in which the forced charging is executed is further raised. Specifically, after the evaluation value ΣD reaches the threshold SD2, the SOC range in which the forced charging is executed is raised such that the engine 2 is started and the forced charging is started when the SOC falls to a lower limit SL3 (SL3>SL2), and the forced charging ends when the SOC increases to an upper limit SU3 (SU3>SU2). As a result, the rate of increase in the evaluation value ΣD in the negative direction is further reduced.

In the above description, the SOC range in which the forced charging is executed is raised as the evaluation value ΣD increases, with a width ΔS of the SOC range in which the forced charging is executed kept constant. However, in order to avoid charging of the battery 16 in the low SOC range, only the lower limit of the SOC range in which the forced charging is executed may be raised as the evaluation value ΣD increases, or the amount of change in the lower limit of the SOC range and the amount of change in the upper limit of the SOC range may differ from each other.

The allowable charging power Win of the battery 16 is limited when the evaluation value ΣD reaches the lower limit SDL, as in the first embodiment.

Figure 7:
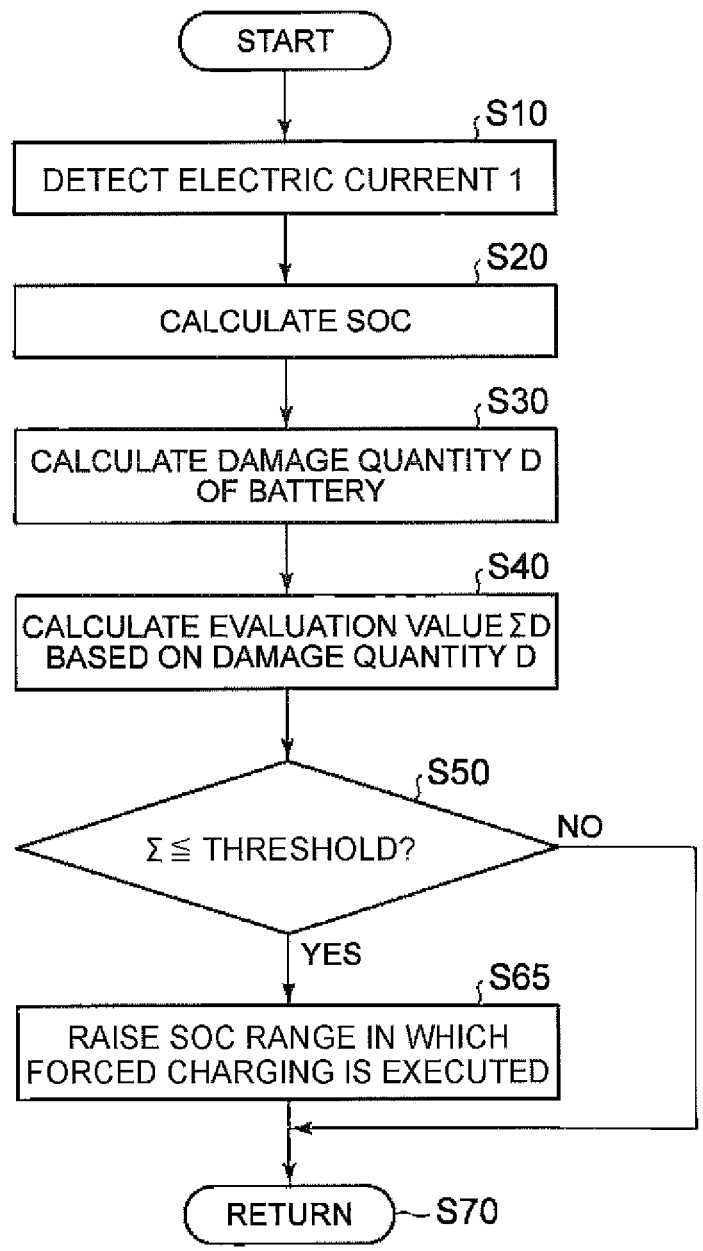
FIG. 7 is a flowchart illustrating the procedure of a high-rate deterioration inhibiting process executed by an ECU in a second embodiment.

FIG. 7 is a flowchart illustrating the procedure of a high-rate deterioration inhibiting process executed by the ECU 26 in the second embodiment. The process illustrated in the flowchart is invoked from a main routine and executed in the prescribed cycle Δt.

As illustrated in FIG. 7, this flowchart is the same as the flowchart illustrated in FIG. 5 except that the flowchart in FIG. 7 includes step S65 instead of step S60 in FIG. 5. When the ECU 26 determines in step S50 that the evaluation value ΣD reaches the threshold (YES in step S50), the ECU 26 raises the SOC range in which the forced charging is executed, to a range that is higher than the range that has been used so far (step S65).

Specifically, as illustrated in FIG. 6, when the ECU 26 determines that the evaluation value ΣD reaches the threshold SD1, the ECU 26 raises the SOC range in which the forced charging is executed, from a range from SL1 to SU1 to a range from SL2 to SU2. In addition, when the ECU 26 determines that the evaluation value ΣD reaches the threshold SD2 (SD2<SD1), the ECU 26 further raises the SOC range in which the forced charging is executed, from the range from SL2 to SU2 to a range from SL3 to SU3.

As described above, in the second embodiment, when the evaluation value ΣD reaches the prescribed threshold (negative value), the SOC range in which the forced charging is executed is raised. It is thus possible to avoid the situation where the battery 16 is charged with electricity in the low SOC range in which high-rate deterioration may be promoted. Therefore, according to the second embodiment, it is possible to reliably inhibit high-rate deterioration of a secondary battery.

In the above-described embodiments, the hybrid vehicle 100 is a series-parallel vehicle in which the power generated by the engine 2 is split by the power split device 4 and then transmitted to the drive shaft 12 and the motor generator 6. However, the embodiments are applicable to the other types of hybrid vehicles. For example, the embodiments are also applicable to, for example, a so-called series hybrid vehicle in which the engine 2 is used only to drive the motor generator 6 and only the motor generator 10 generates drive power for the vehicle, a hybrid vehicle in which, out of kinetic energy produced by an engine, only regenerative energy is collected as electric energy, and a motor-assisted hybrid vehicle in which an engine is used as a main power source and a motor assists power generation as needed.

In addition, in the above-described embodiments, the hybrid vehicle 100 has been described as an example of an electric vehicle, but the application of the embodiments are not limited to hybrid vehicles. For example, the embodiments are also applicable to a fuel cell vehicle in which a fuel cell is mounted as an electric generator that generates electricity with which the battery 16 is charged.

Note that, in the above description, the battery 16 is an example of "secondary battery" in the embodiments, and the ECU 26 is an example of "electronic control unit" in the embodiments.

Combining the configurations in the disclosed embodiments together as appropriate is intended be executed. Moreover, it should be understood that the disclosed embodiments are illustrative and non-restrictive. Various modifications are possible.

What is claimed is:

1. An electric vehicle comprising:
   a vehicle drive apparatus configured to receive electricity to generate vehicle drive power and configured to generate electricity;
   a secondary battery that selectively (i) receives electricity from the vehicle drive apparatus and (ii) outputs electricity to the vehicle drive apparatus;
   a current sensor that selectively detects (a) an electric current to be input into the secondary battery and (b) an electric current output from the secondary battery; and
   an electronic control unit configured to control charging and discharging of the secondary battery, and configured to calculate, using a detected value of the electric current from the current sensor, an evaluation value indicating a degree of deterioration of the secondary battery due to non-uniformity in salt concentration in the secondary battery caused by charging and discharging of the secondary battery, wherein
   the evaluation value is an integrated value of damage quantities of the secondary battery, the damage quantities being calculated based on the detected value of the electric current and an energizing time of the electric current, and
   the electronic control unit is configured to execute a capacity-raising control in which a remaining capacity of the secondary battery is raised, the capacity-raising control being executed by the electronic control unit when the evaluation value reaches a prescribed threshold.

2. The electric vehicle according to claim 1, wherein:
   the electronic control unit is configured to control charging and discharging of the secondary battery such that the remaining capacity approaches a prescribed target; and
   the electronic control unit is configured to execute the capacity-raising control to raise, when the evaluation value reaches the prescribed threshold, a value of the prescribed target to a value higher than the value used when the evaluation value is lower than the prescribed threshold.

3. The electric vehicle according to claim 1, wherein:
   the electronic control unit is configured to control charging and discharging of the secondary battery such that the remaining capacity remains within a prescribed range; and
   the electronic control unit is configured to execute the capacity-raising control to raise, when the evaluation value reaches the prescribed threshold, the prescribed range to a range higher than the prescribed range used when the evaluation value is lower than the prescribed threshold.

4. The electric vehicle according to claim 3, wherein the electronic control unit raises the prescribed range by raising at least one of a lower limit and an upper limit of the prescribed range.

5. The electric vehicle according to claim 1, wherein the vehicle drive apparatus includes an internal combustion engine, and the electric vehicle is a hybrid electric vehicle.

6. A control method for an electric vehicle, the electric vehicle including a vehicle drive apparatus configured to receive electricity to generate vehicle drive power and configured to generate electricity, a secondary battery that selectively (i) receives electricity from the vehicle drive apparatus and (ii) outputs electricity to the vehicle drive apparatus, and a current sensor that selectively detects (a) an electric current to be input into the secondary battery and (b) an electric current output from the secondary battery, the control method performed by the electronic control unit and comprising:
- calculating, using a detected value of the electric current from the current sensor, an evaluation value indicating a degree of deterioration of the secondary battery due to non-uniformity in salt concentration in the secondary battery caused by charging and discharging of the secondary battery; and
- executing a capacity-raising control in which a remaining capacity of the secondary battery is raised, the capacity-raising control being executed when the evaluation value reaches a prescribed threshold, wherein
the evaluation value is an integrated value of damage quantities of the secondary battery, the damage quantities being calculated based on the detected value of the electric current and an energizing time of the electric current.

7. The control method according to claim 6, wherein:
- charging and discharging of the secondary battery is controlled such that the remaining capacity approaches a prescribed target; and
- when the evaluation value reaches the prescribed threshold, the capacity-raising control is executed to raise a value of the prescribed target to a value higher than the value used when the evaluation value is lower than the prescribed threshold.

8. The control method according to claim 6, wherein:
- charging and discharging of the secondary battery is controlled such that the remaining capacity remains within a prescribed range; and
- when the evaluation value reaches the prescribed threshold, the capacity-raising control is executed to raise the prescribed range to a range higher than the prescribed range used when the evaluation value is lower than the prescribed threshold.

9. The control method according to claim 8, wherein the capacity-raising control raises the prescribed range by raising at least one of a lower limit and an upper limit of the prescribed range.

10. The control method according to claim 6, wherein the vehicle drive apparatus includes an internal combustion engine, and the electric vehicle is a hybrid electric vehicle.

* * * * *